(12) United States Patent
Atashbar et al.

(10) Patent No.: US 9,943,128 B2
(45) Date of Patent: Apr. 17, 2018

(54) HELMET IMPACT MONITORING SYSTEM

(71) Applicant: Western Michigan University Research Foundation, Kalamazoo, MI (US)

(72) Inventors: Massood Zandi Atashbar, Portage, MI (US); Margaret Joyce, Kalamazoo, MI (US); Binu Baby Narakathu, Portage, MI (US); Sai Guruva Reddy Avuthu, Kalamazoo, MI (US); Michael Joyce, Kalamazoo, MI (US); Ali Eshkeiti, Kalamazoo, MI (US)

(73) Assignee: Western Michigan University Research Fund, Kalamazoo, MI (US)

( * ) Notice: Subject to any disclaimer, the term of this patent is extended or adjusted under 35 U.S.C. 154(b) by 73 days.

(21) Appl. No.: 14/830,297

(22) Filed: Aug. 19, 2015

(65) Prior Publication Data
US 2016/0050999 A1   Feb. 25, 2016

Related U.S. Application Data

(60) Provisional application No. 62/039,042, filed on Aug. 19, 2014.

(51) Int. Cl.
| | |
|---|---|
| *G08B 1/08* | (2006.01) |
| *A42B 3/04* | (2006.01) |
| *A42B 3/12* | (2006.01) |
| *G01P 15/125* | (2006.01) |
| *G08B 21/18* | (2006.01) |
| *G01P 15/08* | (2006.01) |

(52) U.S. Cl.
CPC ............ *A42B 3/0433* (2013.01); *A42B 3/046* (2013.01); *A42B 3/0466* (2013.01); *A42B 3/12* (2013.01); *G01P 15/0891* (2013.01); *G01P 15/125* (2013.01); *G08B 21/182* (2013.01)

(58) Field of Classification Search
CPC ........................... A42B 3/046; A61B 2503/10
USPC ...................................................... 340/539.11
See application file for complete search history.

(56) References Cited

U.S. PATENT DOCUMENTS

| | | | |
|---|---|---|---|
| 4,659,090 A * | 4/1987 | Kustanovich | ........... G01L 1/144 273/376 |
| 4,837,129 A | 6/1989 | Frisch et al. | |
| 4,883,271 A | 11/1989 | French | |

(Continued)

OTHER PUBLICATIONS

Canadian Patent Office, Office Action, Application No. 2,901,026, dated Aug. 25, 2016, 3 pages.

(Continued)

*Primary Examiner* — Fabricio R Murillo Garcia
(74) *Attorney, Agent, or Firm* — Price Heneveld LLP

(57) ABSTRACT

An impact sensing system includes a first impact sensor having a flexible dielectric layer, a first printed electrode on a first side of the layer, and a second printed electrode on a second side of the layer. The second printed electrode overlies and is moveable toward and away from the first electrode by deformation of the flexible dielectric layer. Further, the layer maintains a capacitance between to the first electrode and the second electrode that changes with a movement of the second electrode toward or away from the first electrode. The system further includes a first readout circuit electronically coupled with the first and second electrodes to measure a change in the capacitance and output a corresponding voltage.

20 Claims, 7 Drawing Sheets

(56) References Cited

U.S. PATENT DOCUMENTS

| | | | |
|---|---|---|---|
| 5,343,569 A | | 9/1994 | Asare et al. |
| 5,534,290 A | * | 7/1996 | Rainwater .............. H01G 4/308 427/126.5 |
| 5,713,082 A | | 2/1998 | Bassette et al. |
| 5,883,568 A | | 3/1999 | Boyden |
| 6,301,718 B1 | | 10/2001 | Rigal |
| 6,332,226 B1 | | 12/2001 | Rush, III |
| 6,459,588 B1 | * | 10/2002 | Morizumi ........ G06K 19/07749 235/492 |
| 6,532,824 B1 | | 3/2003 | Ueno et al. |
| 6,826,509 B2 | | 11/2004 | Crisco, III et al. |
| 7,174,277 B2 | | 2/2007 | Vock et al. |
| 7,295,724 B2 | | 11/2007 | Wang et al. |
| 7,526,389 B2 | | 4/2009 | Greenwald et al. |
| 8,479,585 B2 | | 7/2013 | Shaw-Klein |
| 8,554,509 B2 | | 10/2013 | Crisco, III et al. |
| 2001/0047689 A1 | * | 12/2001 | McIntosh .............. B81B 3/0086 73/514.32 |
| 2004/0252007 A1 | | 12/2004 | Lussey et al. |
| 2006/0284280 A1 | * | 12/2006 | Borland .................. H05K 1/162 257/532 |
| 2007/0056081 A1 | | 3/2007 | Aspray |
| 2011/0045253 A1 | | 2/2011 | Nielsen et al. |
| 2011/0277803 A1 | | 11/2011 | Grande et al. |
| 2012/0318070 A1 | | 12/2012 | Evans |
| 2013/0100030 A1 | | 4/2013 | Los et al. |
| 2013/0127060 A1 | * | 5/2013 | Aboush .............. H01L 23/5223 257/773 |
| 2013/0304052 A1 | | 11/2013 | Rizq et al. |
| 2014/0088454 A1 | | 3/2014 | Mack |
| 2014/0144235 A1 | * | 5/2014 | Suzuki .................. G01P 15/125 73/514.32 |
| 2014/0149067 A1 | | 5/2014 | Merril et al. |
| 2014/0298921 A1 | * | 10/2014 | Surapaneni ............. G01L 1/146 73/862.041 |
| 2016/0018278 A1 | * | 1/2016 | Jeter, II .................. A63B 24/00 340/665 |
| 2017/0018169 A1 | * | 1/2017 | Cholhan ................ G08B 25/10 |

OTHER PUBLICATIONS

Joseph T. Gwin, Jeffrey J. Chu, Thomas A. McAllister, and Richard M. Greenwald; "In situ Measures of Head Impact Acceleration in NCAA Division I Men's Ice Hockey: Implications for ASTM F1045 and Other Ice Hockey Helmet Standards"; Journal of ASTM International; vol. 6, No. 6; Paper ID: JAI101848; 2009; pp. 1-10.

E. Manikandan, K.A. Karthigeyan, and K. Immanuvel Arokia James; "Micro Electro Mechanical System (MEMS) based Pressure Sensor in Barometric Altimeter"; International Journal of Scientific & Engineering Research; vol. 2, No. 8; Aug. 2011; ISSN: 2229-5518; pp. 1-8.

B.B. Narakathu, A. Eshkeiti, A.S.G. Reddy, M. Rebros, E Rebrosova, M.K. Joyce, B.J. Bazuin, M.Z. Atashbar; "A Novel Fully Printed and Flexible Capacitive Pressure Sensor"; IEEE; Department of Electrical and Computer Engineering, Center for the Advancement of Printed Electronics; 2012; pp. 1-4.

A.S.G. Reddy, Binu B. Narakathu, M.Z. Atashbar, M. Rebros, E. Hrehorova, M. Joyce; "Printed Electrochemical Based Biosensors on Flexible Substrates"; IEEE; Department of Electrical and Computer Engineering, Center for the Advancement of Printed Electronics, 2010; pp. 1-5.

Foreman, Scott, MSC., Crossman, Danny, BSC.; "A Comparative Analysis for the Measurement of Head Accelerations in Ice Hockey Helmets using Non-Accelerometer Based Systems"; Impakt Protective Inc., Kanata, Ontario, Canada; pp. 1-13; date unknown.

* cited by examiner

HELMET IMPACT MONITORING SYSTEM

CROSS REFERENCE TO RELATED APPLICATION

This application claims priority under 35 U.S.C. § 119(e) to U.S. Provisional Patent Application No. 62/039,042, filed on Aug. 19, 2014, entitled "HELMET IMPACT MONITORING SYSTEM," which is incorporated herein by reference in its entirety.

BACKGROUND

The present invention relates generally to impact monitoring systems including impact sensors on flexible substrates. In such a system, the flexible substrate including the impact sensor can be coupled with a wearable article of protective equipment and can wirelessly communicate with a computing device, such as a smartphone or the like.

Effort has been directed towards the development of printed electronics using conventional printing technologies. Examples of such printed electronics include, organic thin film transistors ("OTFTs") fabricated using inkjet printing, flexible displays made by means of screen printing, and electrochemical sensors fabricated by rotogravure printing. The use of printing technologies can overcome some of the drawbacks associated with conventional silicon technology, which may involve high-vacuum and high-temperature deposition processes, along with sophisticated photolithographic patterning techniques. The advantages of printing include improved cost efficiency, reduction of material wastage during fabrication, variation in compatible substrate materials, including flexible materials, and low manufacturing temperatures. These advantages have led to the research of traditional printing techniques for the manufacture of flexible impact sensors.

Interest exists in the development of impact sensors on flexible substrates for applications in the aerospace, automotive, and biomedical engineering fields. Impact sensors can be manufactured using conventional CMOS processes which are often expensive and require fabrication on rigid substrates. Accordingly, many impact sensing systems utilize hanging structures or cavity based sensor design configurations, which may include accelerometers, for example. However, further developments are desired to offer greater flexibility, stability and conformability, which may be advantageous for various impact sensing applications, including the use on protective equipment for the human body, including various pieces of sports equipment, such as helmets or the like.

SUMMARY

According to one aspect of the present invention, an impact sensing system includes a first impact sensor having a flexible dielectric layer, a first printed electrode on a first side of the layer, and a second printed electrode on a second side of the layer. The second printed electrode overlies and is moveable toward and away from the first electrode by deformation of the flexible dielectric layer. Further, the layer maintains a capacitance between to the first electrode and the second electrode that changes with a movement of the second electrode toward or away from the first electrode. The system further includes a first readout circuit electronically coupled with the first and second electrodes to measure a change in the capacitance and output a corresponding voltage.

According to another aspect of the present invention, a helmet includes an outer shell defining an interior surface and an exterior surface, a cushioning layer coupled with the shell along the interior surface thereof, and a first impact sensor. The first impact sensor has a flexible dielectric layer, a first printed electrode on a first side of the layer, and a second printed electrode on a second side of the layer overlying and moveable toward and away from the first electrode by deformation of the flexible dielectric layer. The layer maintains a capacitance between the first electrode and the second electrode, and the capacitance changes with a movement of the second electrode toward or away from the first electrode. The helmet further includes a first readout circuit electronically coupled with the first and second electrodes to measure a change in the capacitance and output a corresponding voltage.

According to another aspect of the present invention, a method for making a protective article includes molding an impact-protective substrate element and coupling a first impact sensor of an impact sensing system with the impact-protective substrate element. The impact sensor includes a flexible dielectric layer, a first printed electrode on a first side of the layer, and a second printed electrode on a second side of the layer such that the layer maintains a capacitance between to the first electrode and the second electrode.

These and other features, advantages, and objects of the present device will be further understood and appreciated by those skilled in the art upon studying the following specification, claims, and appended drawings.

DETAILED DESCRIPTION

Figure 1:
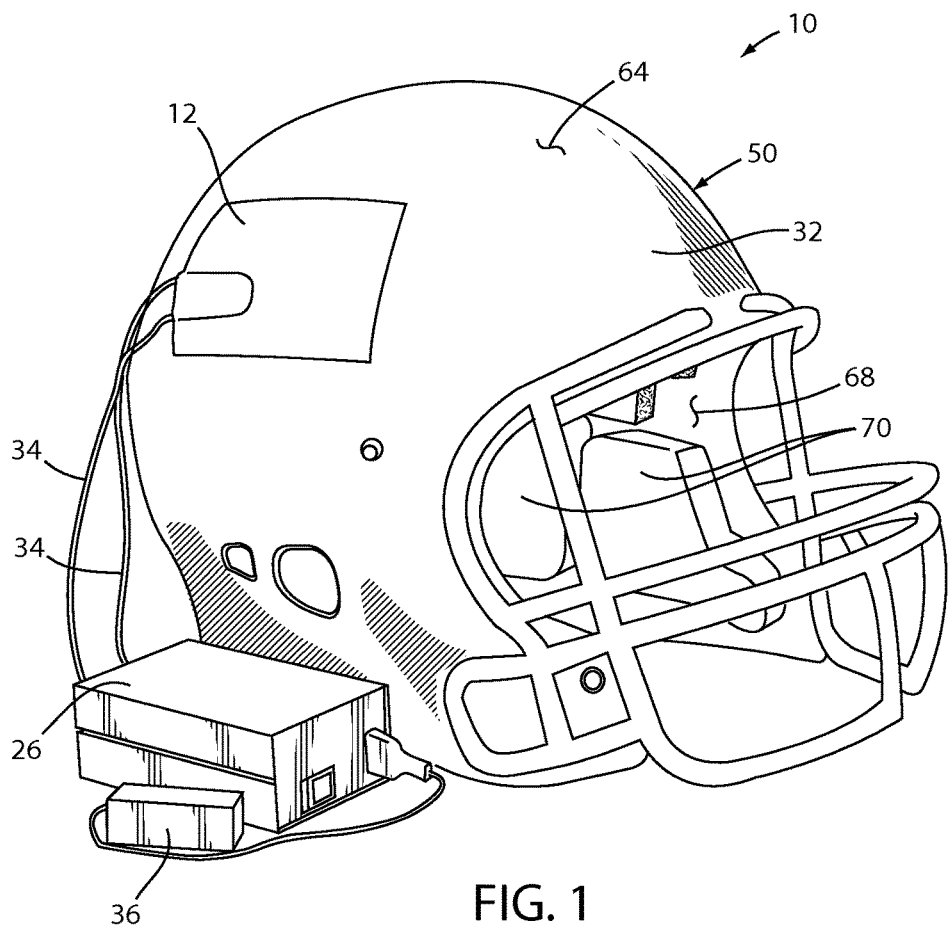
FIG. 1 is a front perspective view of an impact monitoring system including a protective helmet.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Further, unless otherwise noted, similar reference numbers are used to indicate similar features among the various embodiments described herein.

Referring now to FIGS. 1-4, reference numeral 10 generally designates an impact sensing system. Impact sensing system 10 includes a first impact sensor 12 that has a dielectric layer 14 of a generally flexible, dielectric material. Impact sensor 12 further has a first printed electrode 16 on a first side 18 of the dielectric layer 14. A second printed electrode 20 is on a second surface 22 of dielectric layer so as to overlie and be moveable toward and away from the first electrode 16 by deformation of the dielectric layer 14. The overlying arrangement between second electrode 20 and first electrode 16 is such that a capacitance can be built up between the first electrode 16 and the second electrode 20. Such a capacitance can change with movement of the second electrode 20 toward or away from first electrode 16. Impact sensing system 10 further includes a readout circuit 24 (contained within control and communications unit 26 in FIG. 1) electronically coupled with the first electrode 16 and the second electrode 20 to measure a change in the capacitance of second electrode 20 and first electrode 16 into output a corresponding voltage. The Impact sensing system 10 can further include a wireless communication module 28 (also included within control and communications unit 26 in FIG. 1) that is electronically coupled with the readout circuit and is programmed to transmit information relating to the voltage output therefrom.

As further shown in FIGS. 1-4, system 10 can be an impact monitoring system included in an article of protective equipment. In the example shown, the protective equipment is a football helmet 30 having an outer protective shell 32 onto which sensor 12 is mounted. In such an arrangement, an impact with helmet 30 and the area of sensor 12 can be detected and can be quantified according to, for example, the level or significance of the impact with sensor 12 based on the output of the readout circuit 24. In the example shown in FIGS. 1-4, the readout circuit 24 can be included in a control and communication unit 26 that is separate from helmet 30 and sensor 12. Control and communication unit 26 can, accordingly, be attached to a wearer of helmet 30 and can couple with sensor 12 by a wire 34 that can be routed along the body of the wearer. Control and communication unit 26, as mentioned above, can further house the above-mentioned wireless module 28 to transmit information relating to the voltage output to external devices included in system 10. Control and communication unit 26 can further include a power source 36, which in FIG. 1 is depicted as a battery, for providing both the charge to second electrode 20 as well as any necessary power for the operation of readout circuit 24 and wireless module 28.

Impact sensing system 10 can be incorporated with other various types of protective equipment, including other types of helmets such as construction or military helmets, for example. Further, the protective equipment can be in the form of other impact-protective equipment, including shoulder pads, body armor, or the like. In an example, such impact-protective equipment can include at least one impact-protective substrate element, such as a plastic or metal sheet or a layer of plastic or form (e.g. dual density, high density, or the like) to which an impact sensor 12 can be coupled. In the instance of a system 10, including protective headwear, such as in the form of football helmet 30 or the like, the impact monitoring provided by system 10 can be particularly useful in monitoring the degree or severity, as well as the number of, impacts to the head of the wearer of helmet 30, such as by collisions with other players, with the ground, or with other objects. Such impact data can be useful for medical or other team personnel in making assessments related to potential head-impact trauma, including assessments for the possibility of concussion or the like, or can be used for identifying players for whom further assessment may be desired.

Figure 2:
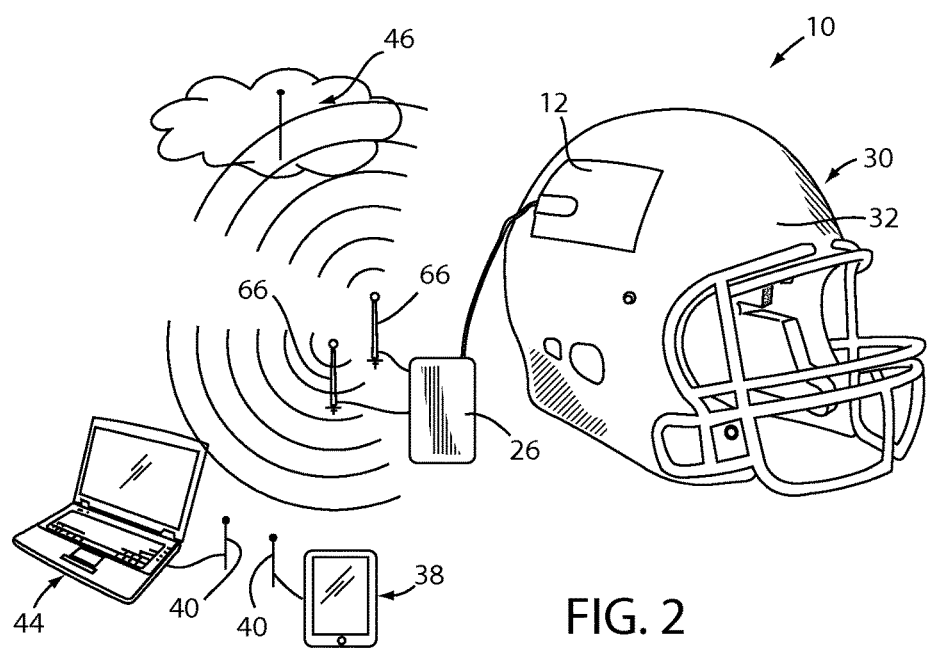
FIG. 2 is a schematic view of the system of FIG. 1, including additional components in communication therewith.

In an example, the wireless capability provided by the incorporation of wireless module 28 into system 10 can provide the advantage of allowing monitoring for head impact data related to the user of helmet 30 in real-time, without the need to attach a separate readout module to helmet 30 for downloading of data after a visually identified impact, at a later time when the helmet is accessible. While further particulars of such monitoring are discussed in further detail below, a general schematic of such capability is depicted in FIG. 2, in which system 10, which includes a sensor 12 mounted on a football helmet 30 and connected by wire 34 to a control and communication unit 26 that includes both a readout circuit 24 and a wireless module 28 therein. The wireless module 28 connects sensor 12 and readout circuit 24 wirelessly with other devices. In the example shown in FIG. 2, wireless module 28 connects with a smartphone 38, having its own wireless receiver 40 incorporated therein. In various examples, both the wireless module 28 and the wireless receiver 40 can share a common communications protocol, which can include Bluetooth, Wi-Fi™, ZigBee™, cellular, RF, or the like.

To incorporate smartphone 38 into system 10, a pairing activity according to a various wireless protocol can be carried out, which can establish communication between wireless module 28 and smartphone 38. Wireless module 28 can then output data as received from readout circuit 24, either continuously, or according to specially-programmed software or firmware upon detecting an impact on sensor 12 to smartphone 38 for viewing by a user thereof, or for analysis by specialized software installed on smartphone 38, an example of which is discussed further below. In a similar manner, a computer 44 can be incorporated into system 10 and can communicate wirelessly with wireless module 28 to implement similar functionality as described above with respect to smartphone 38. Still further, wireless module 28 can communicate, such as by cellular or by Wi-Fi data, with a cloud-based computing system 46 which can store data therein for cataloging, further analysis, and or further communication with devices outside of system 10. In another example, a dedicated monitoring device can be provided with system 10 and can wirelessly communicate with wireless module 28 to facilitate monitoring activity.

Figure 3:
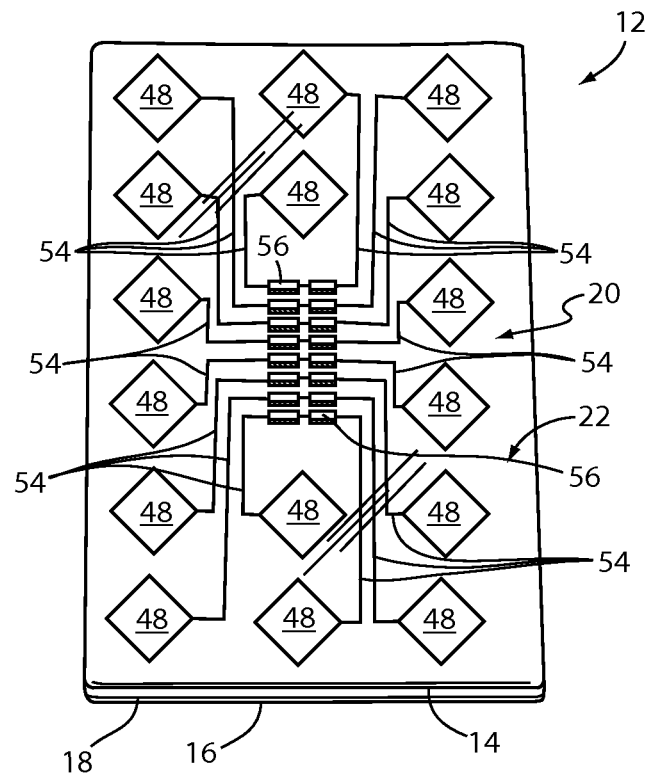
FIG. 3 is a top perspective view of an impact sensor usable in the impact monitoring system of FIG. 1.
Figure 4:
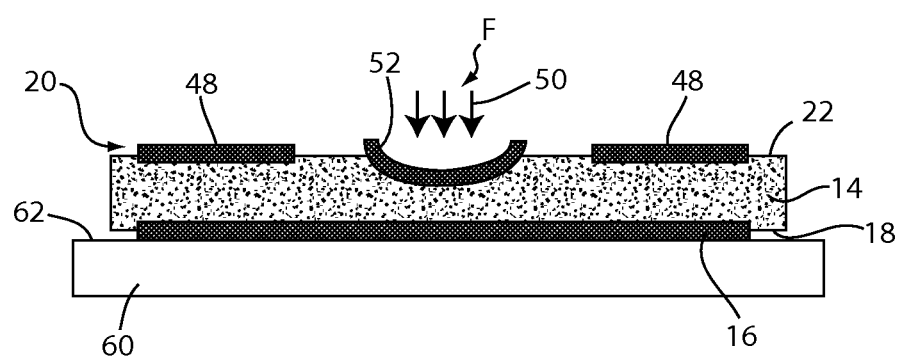
FIG. 4 is a side elevational view of the sensor of FIG. 3 with a force acting thereon.

As shown in FIG. 3, a particular example of a sensor 12 usable in system 10 includes a flexible dielectric layer 14 that extends over a predetermined area. Such an area can be rectangular, as depicted in FIG. 3, or can take on other shapes, such as square, circular, oval, or various amorphous shape particular to the structure with which sensor 12 is to be mounted. In an example, polydimethylsiloxane ("PDMS"), a soft polymer can be used for dielectric layer 14. In such an example a PDMS sheet can be cut into the desired shape for dielectric layer 14 or can be molded from a two-part, heat-curable silicon elastomer mixture. As further shown in FIG. 3, first electrode 16 can be a solid, continuous thin metallic layer. First electrode 16 can be substantially the same size as dielectric layer 14 and, in an example, can be in approximately 6 cm by 9 cm and, in a more particular embodiment, about 6.35 cm by 9.65 cm. As mentioned above, first electrode 16 can be coupled on first side 18 of dielectric layer 14.

As also shown in FIG. 3, second electrode 20 can be in the form of a plurality of separate sensor segments 48 overlying and coupled with second surface 22 of dielectric layer. As shown, sensor segments 48 can be arranged along surface 22 in an array that is distributed over the area of dielectric layer 14, and further over the corresponding area of first electrode 16. As shown, sensor segments 48 can be generally square in shape or can be arranged at an angle relative to dielectric layer 14 so as to appear as diamonds, or the like. Other shapes for sensor segments 48, including circles, other parallelograms, or the like are possible. Regardless of such configurations, sensor segments 48 are arranged along second surface 22 of dielectric layer 14 such that they are separated from one another and, thus, electrically insulated by dielectric layer 14. As such, when the aforementioned electric charge is applied to second electrode 20 it is, accordingly, applied to sensor segments 48 separately, which results in each individual sensor segment 48 having its own capacitive charge stored therein, which is done collectively among sensor segments 48 with first electrode 16.

The ability of sensor segments 48 to maintain a capacitive charge of first electrode 16 is facilitated by the presence of dielectric layer 14 between first electrode 16 and second electrode 20 the fact that dielectric layer 14 is of a flexible, and generally deformable material means that a force applied along one or more of sensor segments 48 can cause the portion of dielectric layer 14 underlying such a sensor segment 48 to deform, thereby allowing sensor segment 48 to move closer to first electrode 16, which causes the capacity of sensor segment 48 to change. This phenomenon is illustrated in the cross-sectional view of FIG. 4, in which a force F is shown as being applied towards sensor 12 in a direction 50 so as to be localized on a particular one of sensor segments 48, which causes the above-mentioned deformation of dielectric layer 14 therebeneath, resulting in the particular sensor 52 becoming deformed and at least a portion thereof moving closer to first electrode 16 compared to its original position. As previously mentioned, such movement causes a change of the capacitance of sensor 52, which can be observed by system 10 including the readout circuit 24.

To further ensure the flexibility of sensor 12, such that the above-described deformation of one or more sensor segments 48 can be accomplished without damaging sensor 12, electrodes 16 and 20 can be made flexible, which can include forming them of a sufficiently thin layer of conductive material such that they can reliably conduct an electrical charge while be generally flexible such that deformation thereof can occur. In one example, electrodes 16 and 20 can be formed by printing, including screen printing, press printing, ink jet printing, or the like using a highly conductive and functional metallic ink. In one example, electrodes 16 and 20 can be printed on the respective surfaces 18 and 22 of dielectric layer 14 directly. Alternatively, first electrode 16 can be printed on a substrate of polyethylene-terephthalate ("PET") substrate. Similarly, second electrode 20 can be printed on its own respective PET substrate, both of which can be done using one of the above-mentioned printing techniques, using for example a conductive silver ink, or the like. The PET sheets with the thusly-formed first electrode 16 and second electrode 20 can then be respectively coupled on first side 18 and second side 22 of dielectric layer 14. Such formation of electrodes 16 and 20 can make sensor 12 flexible enough to at least function in the above-described manner. Sensor 12 can then be mounted on a substrate 60 (FIG. 4), which can be the shell 32 of a helmet 30 or the like.

In addition to the printed sensor segments 48, second electrodes 20 can also include a plurality of traces 54 respectively joined with ones of sensor segments 48 at one end and to the other a contact pad 56, which can be arranged as an array of contact pads 56 located in close proximity with one another so as to form a single area in which the various, separated sensor segments 48 can be coupled with power source 36 and readout circuit 24, for example by the coupling of various individual segments of wire 34 thereto. As shown in FIG. 3, such traces 54 and pads 56 remain separated from one another along surface 22, such that they are insulated from one another by dielectric layer 14. Although shown as being centrally located along sensor 12 in FIG. 3, pads 56 can be located elsewhere along second surface 22, such as along an edge thereof, outside of the array of sensor segments 48, or the like.

Figure 5:
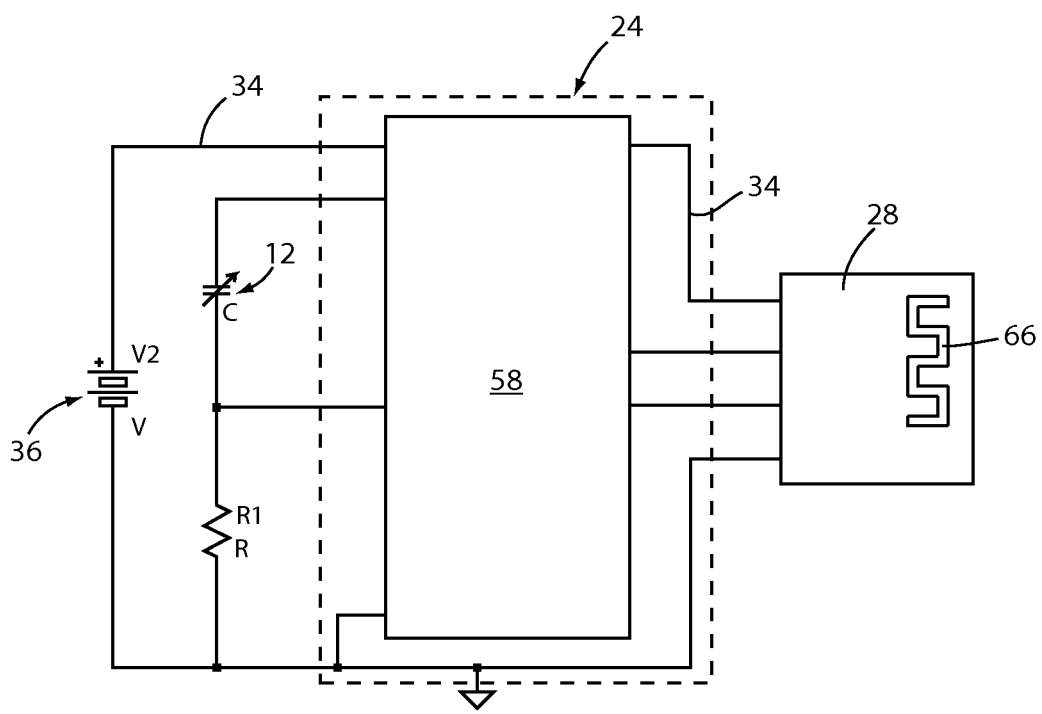
FIG. 5 is a schematic view of the impact sensor coupled with a readout circuit.

Once sensor 12 is connected with readout circuit 24, such as by connection of wire 34 between pads 56 of sensor 12 and control and communication unit 26, a circuit is formed, which is depicted schematically in FIG. 5. As shown, power source 36 provides power for microcontroller 58. Sensor 12 is then connected with microcontroller 58 which then outputs a voltage, as described above, which is based on the measured capacitance from sensor 12, including any change in capacitance among the individual sensor segments 48 thereof. As further shown in FIG. 5, the voltage output from microcontroller 58 is then sent to wireless module 28 which, as mentioned above includes circuitry for one or more wireless communications protocols, as well as one or more corresponding antennas 66 for transmission of wireless signals according to such protocol. Such wireless signals, can be used as described above in connection with the system 10 including one of more wireless devices as shown in FIG. 2.

Figure 6:
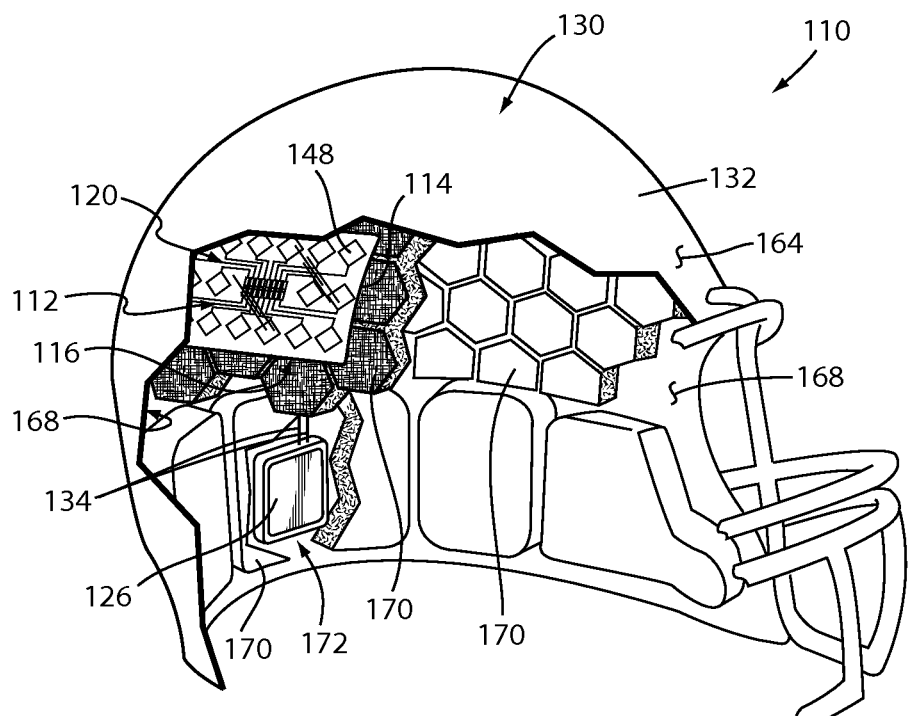
FIG. 6 is a partial cutaway perspective view of an impact monitoring system including an alternative use thereof in connection with a protective helmet.

FIG. 6 shows a variation of a system 110 incorporating a sensor 112 that is similar to sensor 12, as discussed above in FIGS. 1-5, and used in connection with a helmet 30, which is shown in the example as a football helmet. In this variation of the system 110, sensor 112 is coupled with shell 132 of helmet 130 along in interior surface 168 thereof such that an impact with outer surface 164 of helmet 130 can be measured by sensor 112 based on a deformation of a portion of sensor 112, such as over one or more sensor segments 148 included in second electrode 120, or within a portion of first electrode 116. In such an example, sensor 112 is coupled with interior surface 168 of shell 132 with second electrode 120 disposed toward such interior surface 168, as shown, or with first electrode 116 disposed toward interior surface 168. An interior cushioning layer, which can comprise a plurality of protective pads 170 of helmet 130, which are shown in an exemplary construction in FIG. 6, can then be assembled within helmet 130 over portions of the interior 168 of shell 132, as well as over portions of sensor 112. Accordingly, when an impact is applied to a portion of shell 132 of helmet 130, pads 170 are compressed against the head of the wearer, which can cause deformation of sensor 112 by compression between pads 170 and shell 132.

In the variation of system 110 shown in FIG. 6, as well as that which is shown in FIG. 1, the flexibility of sensor 112, including that of dielectric layer 114 can help not only to facilitate deformation of electrodes 116 and 120, including sensor segments 148 but also to allow sensor 112 be affixed to non-planar surfaces such as that of either the interior surface 168, or the exterior surface 164 of shell 132. In a further variation of the system 110 shown in FIG. 6, additional sensors 112 can be positioned along interior surface 168 of shell 132 at further locations therealong, which can be strategically determined based on likely areas of impact or areas where it is determined that measuring impact could be beneficial. In yet another variation, as mentioned above, a single, larger sensor having an amorphous shape configured to be positioned along interior surface 168 of shell 132 can be used.

As also shown in FIG. 6, system 110 is shown having control and communication unit 126 mounted within a compartment 172 within a particular one of pads 170. As such, wire 134 can be positioned along the interior surface 168 of shell 132 to connect sensor 112 with unit 126. Such a configuration can make the use of sensor 112 more convenient for a user, as unit 126 does not have to be separately affixed with the user's clothing or other protective equipment. Such placement of unit 126 can also be implemented in connection with unit 26 in the variation of system 10 including sensor 12 positioned along the outer surface 64 of helmet 30, as shown in FIG. 1.

Figure 7:
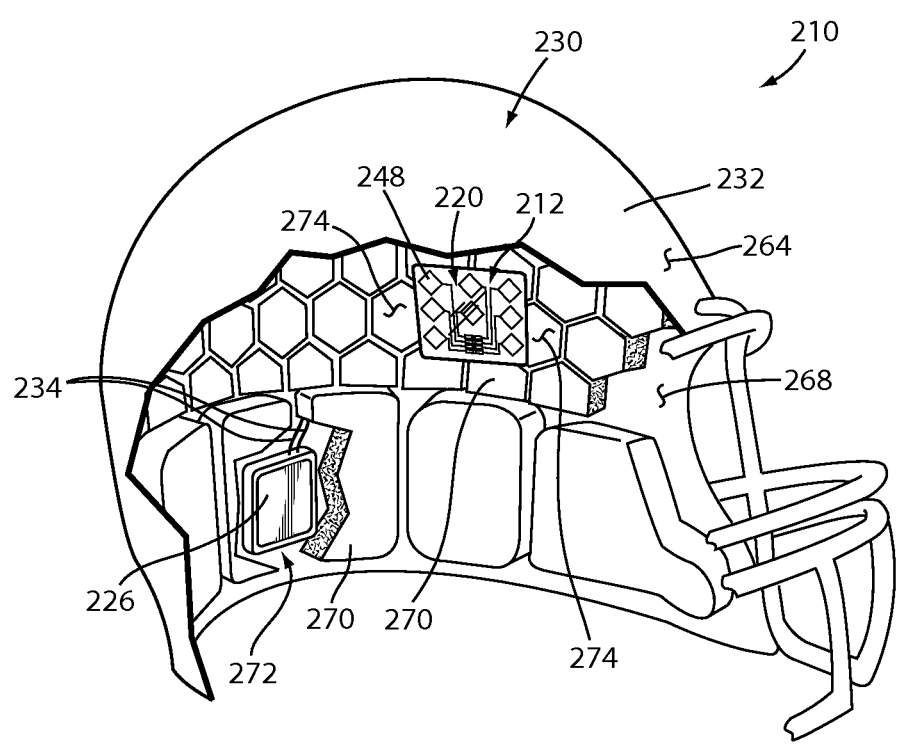
FIG. 7 is a partial cutaway perspective view of an impact monitoring system including a further alternative use thereof in connection with a protective helmet.

As shown in FIG. 7, a further variation of system 210 can include one or more sensors 212 that is coupled at innermost surface 274 of one or more pads 270. In this variation, sensor 212 is, accordingly, positioned against a head of wearer of helmet 230 such that the force with which helmet 230 is impacted to the head of the user can be directly measured by sensor 212. Sensor 212 can be coupled with pad 270 with first electrode 216 positioned against surface 274 of pads 270 such that second electrode 220, including sensor segments 248 contact the head of the wearer. Such a configuration can allow for sensor 212 to provide information regarding the particular location of an impact application of force to the user's head. In an alternative arrangement, sensor 212 can be coupled with surface 274 of pad 270 such that second electrodes 220 are positioned against pads 270. As with the variation of system 110 discussed above with respect to FIG. 6, system 210 can include one or more wires 234 from corresponding sensors 212 to connect with control and communication unit 226, which, as depicted, may be positioned within a compartment 272 within a specialized pad 270 or may be located outside of helmet 230 as shown in FIG. 1. In further variations of any of the systems depicted in FIG. 1, 6, or 7, multiple sensors in any of the depicted positions (outside of the shell 32, inside the shell 32, our inside the cushioning layer) or multiple ones of the positions can be included, such sensors being connected with a common control and communications unit, itself including a common wireless module.

Figure 8:
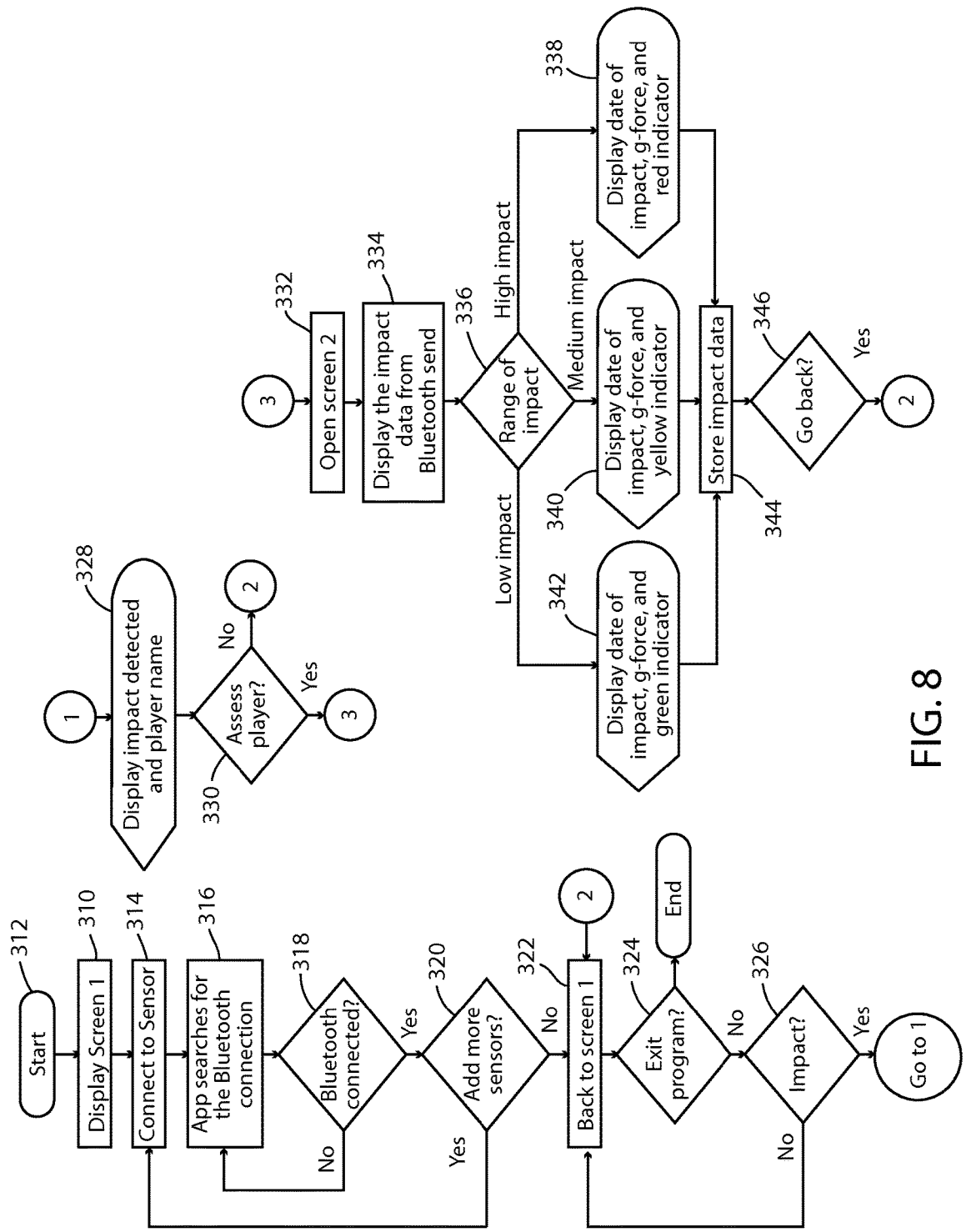
FIG. 8 is a flowchart depicting various steps performed by a computer program included in the system of FIG. 2.
Figure 9C:
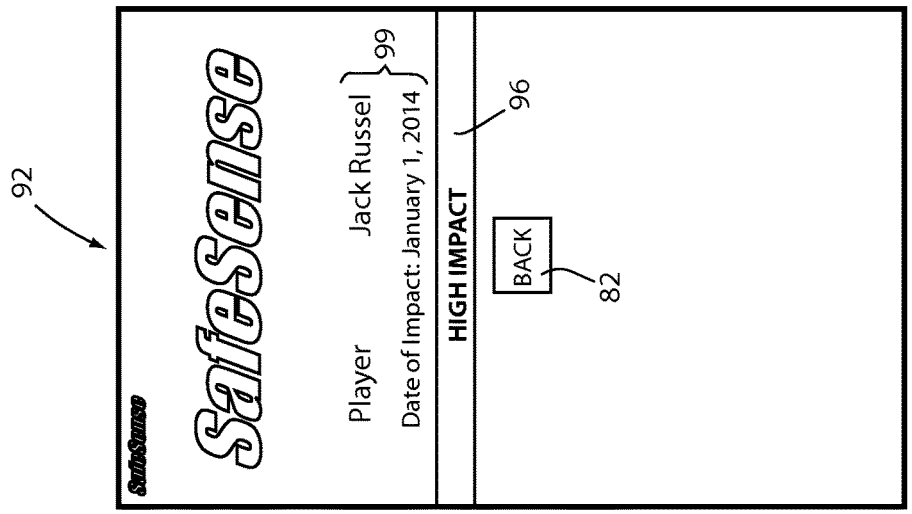
FIGS. 9A-9C show various examples of displays of a user interface displayed by the computer program during steps illustrated in FIG. 8.
Figure 9B:
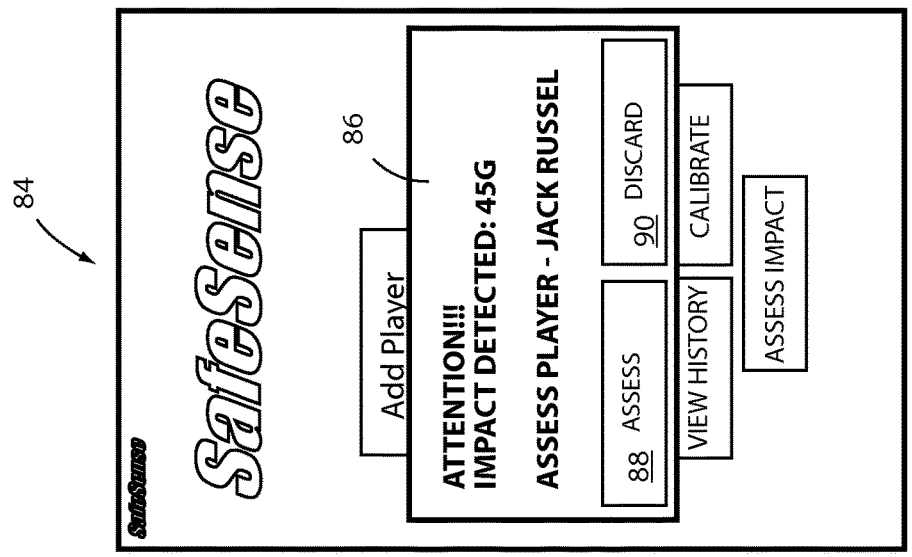
Figure 9A:
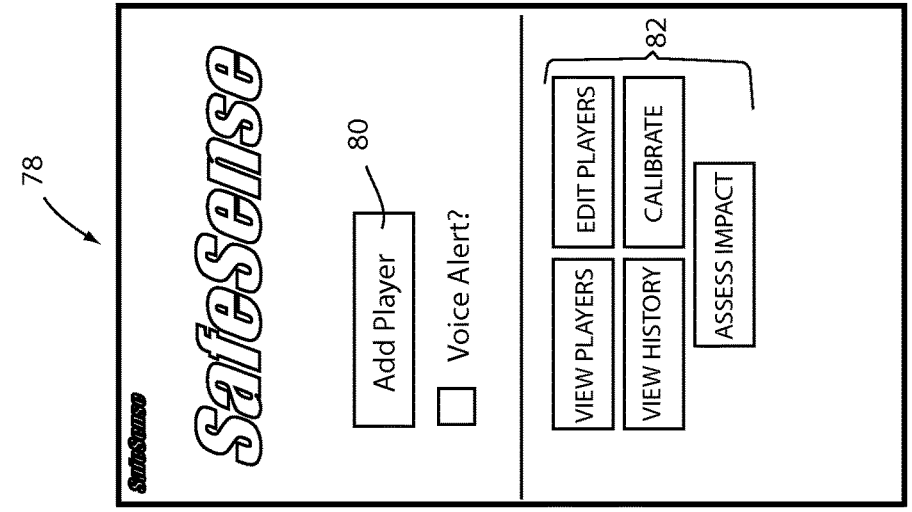

As discussed above, system 10 can include one or more electronic devices, such as a smartphone 38 or computer 44, with which control and communication unit 26 can communicate by wireless protocol. As such, smartphone 38 or computer 44 can include a specifically-designed program or application programmed to interpret such information and to communicate it to a user. In an example of such an application for a smartphone 38 can operate according to the logic depicted in FIG. 8 and can display the results of such logic to a user through an interface, an example of which is depicted in FIGS. 9A-9C. As illustrated in FIG. 8 and in FIG. 9A, a start screen 78 (step 310) can be displayed upon starting the application in step 312. The user can then use the simulated "add player" button 80 to connect with one or more sensors, such as sensor 12 in one or more helmets 30 to correspond with players that the user would like to monitor. Such a connection can be made in steps 314-320 during which the application searches for Bluetooth connections before establishing such a connection and, optionally adding more connections with additional sensors.

After establishing connections with the desired sensors 12, the application can return to the initial screen 78, as depicted in FIG. 9A in step 322. When connected with the desired sensors, the program can wait in an idle mode for either the user to exit the program in step 324 or for one of the sensors 12 to send a signal via wireless module 28 that an impact has been detected in step 326. If no impacts are detected program remains in idle mode, and when an impact is detected the program enters a display mode, as shown in FIG. 9B in which a notification of an impact is given by directing device to display a desired image or animation and/or present an audible indication, along with a designation of the particular sensor 12, such as a player name, with which the impact is detected in step 328. At such an instance the message can either be dismissed in which the application returns to the idle screen in FIG. 9a in step 322. If the user determines that an assessment is desired, in step 330, the application can then display the assessment screen as shown in FIG. 9C (step 332) on which impact data 96 can be displayed on screen 84 in step 334. If assessment is bypassed using button 90, such information can be later accessed using a designated one of the additional function buttons 82, depicted on screen 78 (FIG. 9A).

As shown in the example of FIG. 8, in step 336 the application can determine a range (e.g., either low, medium, or high) into which the detected impact can be categorized. Such categorization can depend on for example, the type of protective equipment being used, the type of activity, the age of the wearer of the equipment, or other factors. As shown in the example of FIG. 9C the impact information display 96 can include specific notification corresponding to the level of impact detected, which is shown in FIG. 9C as a high impact as determined in step 338. As also shown in FIG. 8, different displays such as a medium impact and a low impact can be displayed with corresponding variations in screen 92, as indicated in steps 340 and 342. The application can then collect and store the impact data in step 344 for future retrieval by user using the application, or for further use by the application itself, including an adjustment to the impact range for subsequent impact in a predetermined time period. For example, the application can present a different warning after accumulation of a predetermined aggregate (in number and severity, for example) of medium and low impacts reaching a predetermined threshold. After the information screen 92 has been viewed by the user, a designated function button 82 can be used to return to the screen 78 shown in FIG. 9A where the application awaits further impact information or for the program to be exited. Similar monitoring logic and smartphone applications can be used to in connection with the variations of the systems shown in FIG. 6 (system 110) and FIG. 7 (system 210) discussed above, with any necessary calibration being made for the locations of any included sensors 112 or 212.

Figure 10:
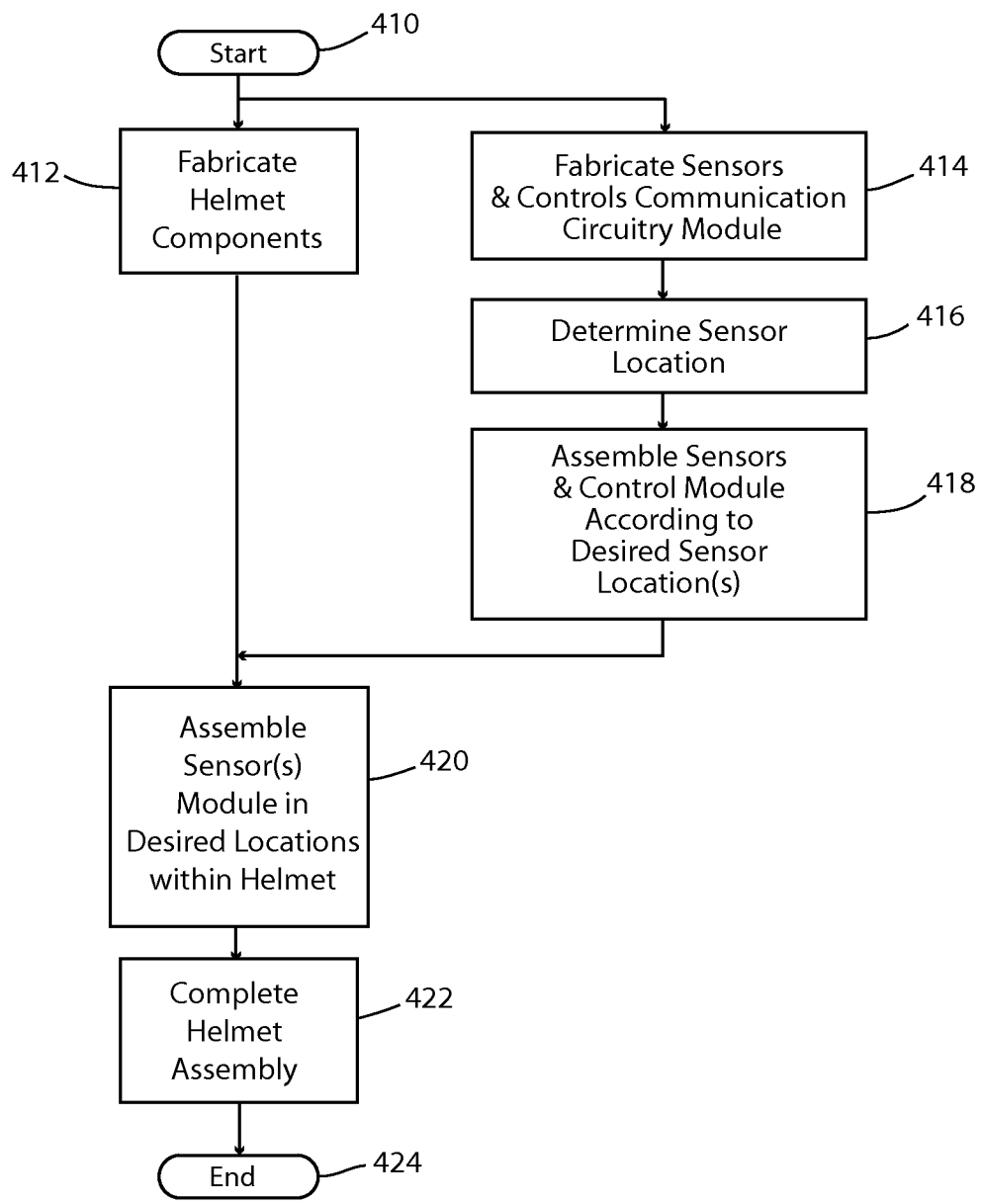
FIG. 10 is a flowchart depicting various steps of a method for fabricating an impact sensing system including an impact sensor and a protective helmet.

Various steps for the manufacture of a system according to the present disclosure, such as system 10, is depicted in FIG. 10. At the start (step 410) of the method, the helmet components can be manufactured in step 412 according to the particular type of helmet or the particular fabrication methods involved therein. Similarly, the sensors 12 to be used in system 10 can be fabricated according to the procedure described above with respect to FIG. 3 in step 414. The sensors 12 and control and communication unit 26 can then assembled together using wires 34 or the like according to the determined locations for sensors 12 in step 418. Subsequently, the assembled sensors 12 and unit 26 can be assembled with the shell 32 of helmet 30 in step 420. Such assembly can be done according to the various examples discussed herein, such as in connection with system 10, as shown in FIG. 1, system 110 as shown in FIG. 6, or system 210 as shown in FIG. 7. After such assembly, additional components of helmet 30 can be assembled therewith in step 422 and the assembly can be completed in step 424.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An impact sensing system for mounting on a substrate of a protective equipment article, comprising:
   a first impact sensor including:
      a dielectric layer that is deformable in a thickness and flexible between a planar condition and a non-planar condition;
      a first printed electrode on a first side of the dielectric layer; and
      a second printed electrode on a second side of the dielectric layer overlying and moveable toward and away from the first electrode by deformation of the dielectric layer, the dielectric layer maintaining a capacitance between the first electrode and the second electrode, including when the dielectric layer is flexed from the planar condition into the non-planar condition, the capacitance changing with a movement of the second electrode toward or away from the first electrode; and
   a first readout circuit electronically coupled with the first and second electrodes to measure a change in the capacitance and output a corresponding voltage.

2. The impact sensing system of claim 1, further comprising the protective equipment article comprising a helmet, the first impact sensor being coupled with the helmet along one of the first and second sides of the layer.

3. The impact sensing system of claim 2, wherein:
   the substrate of the protective article is a shell of the helmet and defines a non-planar outer surface; and
   the first impact sensor is coupled with the shell along the outer surface and conforms to the non-planar outer surface of the shell.

4. The impact sensing system of claim 2, wherein:
   the substrate of the protective article is a shell of the helmet and defines a non-planar interior surface; and
   the first impact sensor is coupled with the shell along the interior surface and conforms to the non-planar interior surface of the shell.

5. The impact sensing system of claim 2, wherein:
   the substrate of the protective article is a shell of the helmet and defines an interior surface and a cushioning layer coupled with the interior surface of the shell; and
   the first impact sensor is mounted with the substrate of the protective article by being coupled with the cushioning layer, including on a non-planar portion, at least a portion of the first impact sensor conforming to the non-planar portion of the cushioning layer.

6. The impact sensing system of claim 1, further comprising the protective equipment article including at least one impact-protective, non-planar substrate element, the first impact sensor being coupled with such substrate element along one of the first and second sides of the layer and conforming to the substrate element.

7. The impact sensing system of claim 1, further comprising a wireless communication module electronically coupled with the first readout circuit and programmed to transmit information relating to the voltage output.

8. The impact sensing system of claim 7, further comprising an electronic device including:
   a wireless receiver paired with the wireless communication module to receive the transmitted information from the wireless communication module; and
   software programmed to interpret the information relating to the voltage output as information relating to an impact applied to the first impact sensor.

9. The impact sensing system of claim 8, wherein the electronic device is one of a computer and a smartphone.

10. The impact sensing system of claim 8, wherein the software is further programmed to collect data relating to a plurality of impacts applied to the first impact sensor and direct the electronic device to output a notification relating to an accumulation of a number and a severity of the plurality of impacts reaching a predetermined threshold.

11. The impact sensing system of claim 8, wherein:
the wireless receiver of the electronic device is further paired with a plurality of wireless communication modules coupled with respective ones of a plurality of readout circuits; and
the software is further programmed to interpret further information received from the plurality of wireless communication modules.

12. The impact sensing system of claim 7, wherein:
the first impact sensor is one of a plurality of impact sensors, each of the plurality of impact sensors respectively including:
a dielectric layer that is deformable in a thickness and flexible between a planar condition and a non-planar condition;
a first printed electrode on a first side of the dielectric layer; and
a second printed electrode on a second side of the flexible dielectric layer so as to maintain a capacitance between to the first electrode and the second electrode including when the dielectric layer is flexed from the planar condition into the non-planar condition; and
the first readout circuit is one of a plurality of readout circuits, each readout circuit being coupled with the wireless communication module and further electronically coupled with respective ones of the first and second electrodes of a respective one of the plurality of impact sensors to measure a change in the capacitance between the respective ones of the first electrodes and the second electrodes and output a corresponding voltage to the wireless communication module.

13. A helmet, comprising:
an outer shell defining an interior surface and an exterior surface;
a cushioning layer coupled with the shell along the interior surface of the shell; and
a first impact sensor coupled with one of the outer shell and the cushioning layer and including:
a dielectric layer that is deformable in a thickness and flexible between a planar condition and a non-planar condition;
a first printed electrode on a first side of the dielectric layer; and
a second printed electrode on a second side of the dielectric layer overlying and moveable toward and away from the first electrode by deformation of the dielectric layer, the dielectric layer maintaining a capacitance between the first electrode and the second electrode, including when the dielectric layer is flexed from the planar condition into the non-planar condition, the capacitance changing with a movement of the second electrode toward or away from the first electrode; and
a first readout circuit electronically coupled with the first and second electrodes to measure a change in the capacitance and output a corresponding voltage.

14. The helmet of claim 13, further comprising a control and communication module including the first readout circuit and a wireless communication module electronically coupled with the first readout circuit, the wireless communication module being programmed to transmit information relating to the voltage output.

15. The helmet of claim 14, wherein the control and communication module is mounted within a portion of the cushioning layer.

16. The helmet of claim 14, wherein:
the interior surface of the outer shell is non-planar; and
the first impact sensor is coupled with the interior surface of the shell, conforms to the interior surface, and is disposed between the shell and the cushioning layer.

17. The helmet of claim 14, wherein:
the cushioning layer includes a non-planar portion; and
the first impact sensor is coupled with the cushioning layer, at least a portion of the first impact sensor conforming to the non-planar portion of the cushioning layer.

18. A method for making a protective article, comprising:
molding an impact-protective substrate element including a non-planar portion; and
coupling a first impact sensor of an impact sensing system with the impact-protective substrate element along the non-planar portion, the impact sensor including:
a dielectric layer that is deformable in a thickness and flexible between a planar condition and a non-planar condition;
a first printed electrode on a first side of the dielectric layer; and
a second printed electrode on a second side of the dielectric layer such that the dielectric layer maintains a capacitance between the first electrode and the second electrode, including when the dielectric layer is flexed from the planar condition into the non-planar condition;
wherein the first impact sensor conforms to the non-planar portion of the impact-protective substrate element at least by flexing of the dielectric layer.

19. The method of claim 18, further comprising:
prior to coupling the first impact sensor with the impact-protective substrate element, electrically coupling the first and second printed electrodes with a readout circuit, the readout circuit measuring a change in the capacitance and outputting a corresponding voltage; and
coupling the readout circuit with a wireless communication module, the wireless communication module being programmed to transmit information relating to the voltage output.

20. The method of claim 19, wherein:
the impact-protective substrate element is a shell of a helmet, the shell defining an interior surface, the non-planar portion being included on the interior surface; and
the first impact sensor is coupled with the interior surface of the shell.

* * * * *